United States Patent [19]

Kruse

[11] 4,350,280

[45] Sep. 21, 1982

[54] SMOKE EXHAUST APPARATUS FOR A ROTARY WELDER

[76] Inventor: Stanley K. Kruse, 4122 O'Day Rd., Ft. Wayne, Ind. 46818

[21] Appl. No.: 148,961

[22] Filed: May 12, 1980

[51] Int. Cl.³ .............................................. B23K 28/02

[52] U.S. Cl. ....................................... 228/29; 266/158; 266/159

[58] Field of Search ...................... 228/29; 266/54, 56, 266/144, 158, 159, 48; 308/36.1

[56] References Cited

U.S. PATENT DOCUMENTS

| | | | |
|---|---|---|---|
| 3,266,269 | 8/1966 | Stokely | 308/36.1 |
| 3,492,055 | 1/1970 | Frankland | 308/36.1 |
| 3,741,555 | 6/1973 | Roesel | 228/29 |
| 3,797,813 | 3/1974 | Roesel | 228/29 |
| 3,825,272 | 7/1974 | Townsend | 308/36.1 |
| 4,058,299 | 11/1977 | Lindkvist | 266/48 |

*Primary Examiner*—John McQuade

*Attorney, Agent, or Firm*—Gust, Irish, Jeffers & Hoffman

[57] ABSTRACT

An improved smoke exhaust apparatus for a rotary welder which comprises an elongated stationary carrier having a support member mounted thereon for rotation about an upright axis. Plenum and shroud elements are vertically spaced apart and are connected to such support member for rotation therewith. The plenum is provided with intake and exhaust ports. The shroud includes a horizontally disposed plate having a depending skirt around a portion of the periphery thereof to provide an opening in the side of the shroud. Smoke inlet ports are provided in the plate and tubes connect the smoke inlet ports to the respective intake ports whereby suction applied to the exhaust ports of the plenum causes flow of air from the interior of the shroud upwardly through the smoke inlet ports, the tubing and intake ports and into the plenum from which such flow passes outwardly of the exhaust ports.

5 Claims, 3 Drawing Figures

SMOKE EXHAUST APPARATUS FOR A ROTARY WELDER

FIELD OF THE INVENTION

The present invention relates to smoke apparatus for capturing and exhausting smoke and fumes produced by a rotary welding or cutting machine.

DESCRIPTION OF THE PRIOR ART

Rotary welders or cutting machines of the type disclosed in U.S. Pat. Nos. 3,741,555 and 3,797,813 generate a substantial volume of fumes and smoke during a welding or cutting operation. Prior art apparatus has been used for the purpose of scavanging and exhausting such fumes and smoke, such apparatus being attached to the machine for rotation therewith. Such apparatus includes an upright stationary supporting rod having a hollow shaft mounted thereon for rotation about an upright axis. Plenum and shroud elements vertically spaced apart are connected to the support member for rotation therewith, the plenum being provided with one intake and two exhaust ports. The plenum includes a side wall rotatable as before mentioned and a top plate held stationary which moveably engages the upper perimetral edge of the side wall to serve as a closure for the plenum. One side of the wall is provided with an intake port which receives a pipe fitting.

The shroud includes a horizontally disposed plate provided with a fitting having a section of flexible tubing extending therefrom to the fitting attached to the plenum. The metal-working device of the welding or cutting machine is disposed beneath the shroud such that smoke or fumes generated thereby are collected by the shroud and exhausted therefrom by the fittings and tubings, into the plenum from which it is further exhausted out of the exhaust ports in the top plate of the plenum.

Since the inlet port on the shroud is horizontally aligned, currents of air are drawn horizontally across the shroud for picking up the fumes and smoke. It has been found that this particular system permits the escape of some of the fumes and smoke into the atmosphere in the working space around the machine, which is undesirable.

Further, such prior art apparatus includes a horizontally disposed, flat gear affixed to the supporting rod at a location beneath the plenum. The side wall of the plenum has a radially inwardly horizontally extending flat flange disposed above in vertically spaced relation with respect to the gear. Since the flange is attached to the side wall of the plenum it rotates therewith while the gear remains stationary. In order to provide a seal between the flange and the gear, a metal slip ring is interposed between the flange and the gear, but it has been found that the slip ring does not completely close the space and thereby admits the ingress of air therepast which reduces the exhausting efficiency of the apparatus.

SUMMARY OF THE INVENTION

The present invention includes smoke exhaust apparatus for a rotary welder or cutter which includes an upright elongated stationary carrier having a hollow shaft mounted thereon for rotation about an upright axis. Plenum and shroud elements vertically spaced apart are connected to the hollow shaft for rotation therewith. The plenum is provided with intake and exhaust ports. The shroud includes a horizontally disposed plate having a depending skirt around a portion of the periphery thereof to provide an opening in the side of the shroud. Two or more smoke inlet ports are provided in the plate, and sections of tubing connect the smoke inlet ports to the intake ports in the plenum. Suction applied to the exhaust ports causes a flow of air generally vertically beneath the shroud into the interior thereof upwardly through the smoke inlet ports, through the tubing and intake ports and into the plenum from which such flow passes outwardly of the exhaust ports. One of the inlet ports is disposed adjacent the side of the shroud opposite and remote from the opening while the other inlet port is positioned adjacent to the opening.

A rubber-like sealing gasket is disposed between the gear and a plenum flange for effectively closing and sealing the bottom portion of the plenum against leakage.

It is a object of this invention to provide a new and improved apparatus for exhausting the fumes and smoke generated by the operation of a rotary welding or cutting machine.

The above-mentioned and other features and objects of this invention and the manner of attaining them will become more apparent and the invention itself will be best understood by reference to the following description of an embodiment of the invention taken in conjunction with the accompanying drawings.

IN THE DRAWINGS

FIG. 1 is a side view of one embodiment of this invention as mounted on a typical welding or cutting machine as disclosed in U.S. Pat. Nos. 3,741,555 and 3,797,813;

Figure 1:
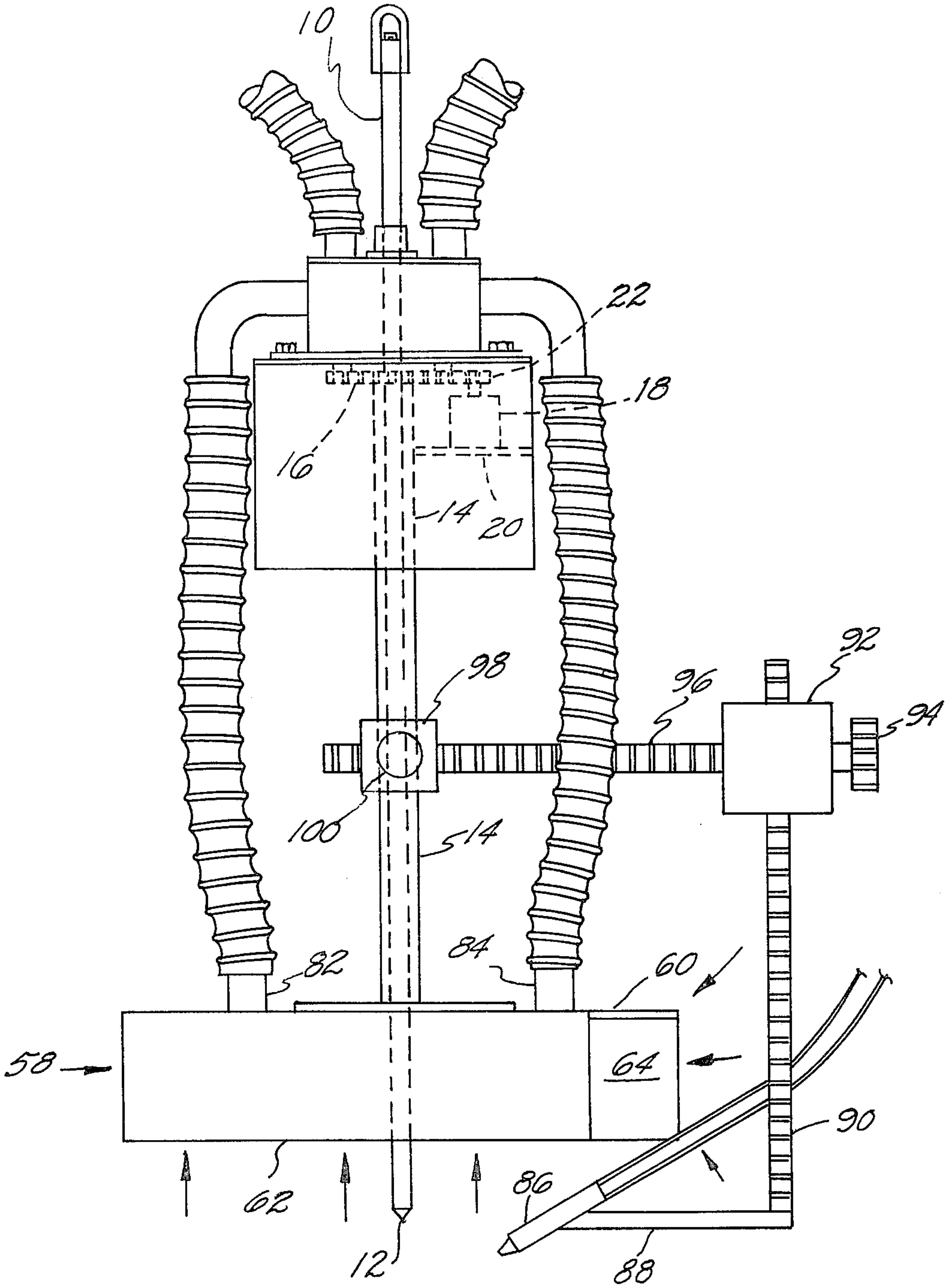
Figure 2:
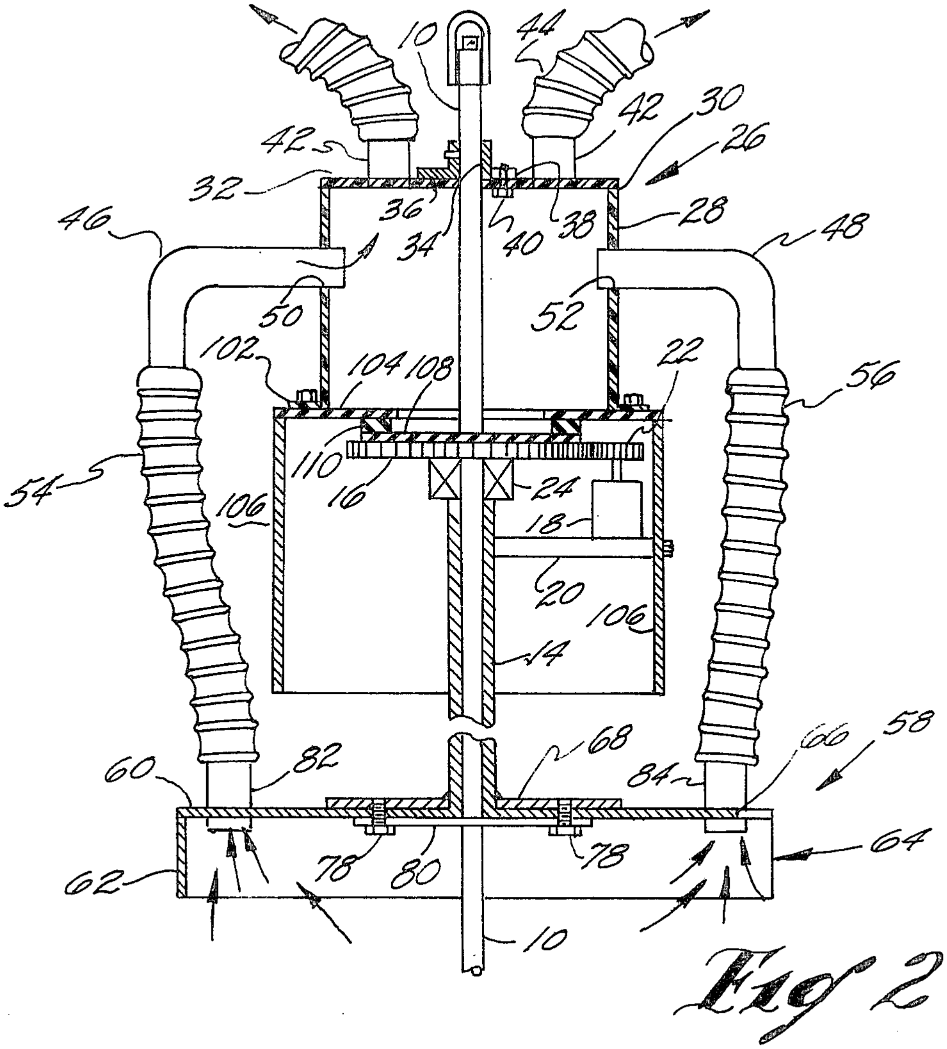
FIG. 2 is a vertical sectional view thereof.
Figure 3:
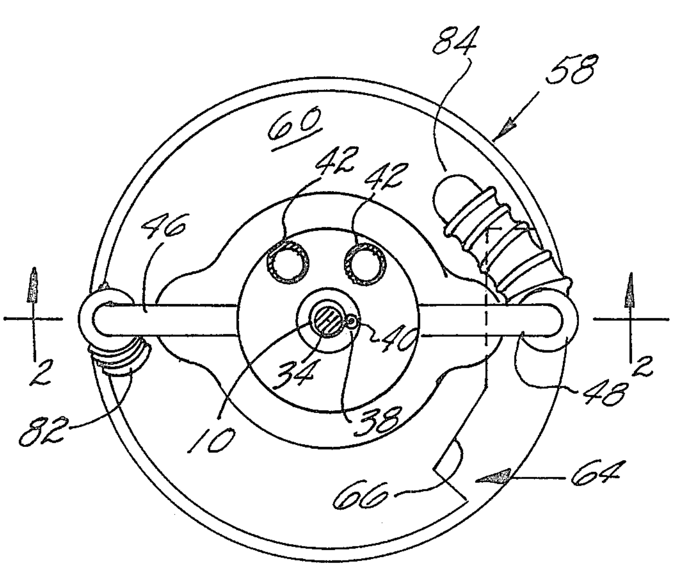
FIG. 3 is a top plan view.

Referring to the drawings, and more particularly to FIG. 1, a typical rotary welding or cutting machine is shown in part, the details of such machine being disclosed in the aforesaid U.S. Patents, which disclosure is included herein by reference. Such a machine includes a stationary upright supporting rod 10 provided with a work-centering point 12 on the lower end. A hollow shaft 14 is telescoped over the rod 10 to be rotatable thereabout.

A relatively large diameter gear 16 is secured to the rod 10 and thus is held stationary. A drive motor 18 is carried by a supporting arm 20 secured at one end to the shaft 14. A drive gear 22 mounted on the output shaft of the motor 18 is meshed with the gear 16 such that rotation of the gear 22 by the motor 18 results in the motor 18, the supporting arm 20 and the rotary shaft 14 rotating about the supporting rod 10.

A suitable thrust bearing 24 is interposed between the end of the rotary shaft 14 and the gear 16 to accomodate relative rotation therebetween.

A plenum indicated generally by the numeral 26 includes a cylindrical side wall 28 having a perimetral upper edge 30 which defines a horizontal plane. A plenum cover or top plate 32 rests on this edge 30 as shown and is suitably held against rotation, such as by means of a collar 34 on rod 10 having a flange 36 provided with an enlarged opening 38. A threaded fastener 40 threads through the top plate 32 to be received by an enlarged opening 38 in flange 36. The fastener 40 is not secured to the flange 36 but serves only as a stop preventing rotation of the plate 32 by reason of engagement of the fastener 40 with the side of the enlarged opening 38. A suitable set screw secures the collar 34 to the rod 10.

Two smoke exhaust fittings are secured within openings in the top plate 32 as shown and have connected thereto sections of flexible tubing 44 for exhausting smoke and fumes from the plenum 26. Two elbow fittings 46 and 48 are secured to diametrically opposed plenum intake ports 50 and 52, respectively, with the outer ends disposed downwardly to be connected to sections 54 and 56 of flexible tubing.

Mounted on the lower end of the rotatable shaft 14 is a shroud generally indicated by the numeral 58, this shroud including a horizontally disposed, flat plate 60 and a depending cylindrical skirt 62 which extends around only a portion thereof to provide a side opening 64. The top plate 60 is cut back as indicated by the numeral 66 in registry with the opening 64. The shroud 58 thus has an opening in the side thereof as well as a portion of the top for a purpose which will become apparent from the description that follows.

On the lower end of the hollow rod 14 is welded a flat, horizontally disposed flange 68 which is coaxially secured to the shroud plate 60 by means of threaded fasteners 78. Also secured to the shroud plate 60 by means of fasteners 78 is a bearing 80 which rotatably mounts the shroud on the supporting rod 10. Two smoke inlet fittings 82 and 84 are mounted within companion openings in the shroud plate 60 as shown. Fitting 82 is disposed diametrically opposite the shroud opening 64 on the remote side of the shroud plate while the fitting 84 is located adjacent to opening 64. The section 54 and 56 of flexible tubing are connected to the fittings 82 and 84, respectively, as shown.

The nozzle 86 of the welding or cutting machine is held a suitable distance beneath the shroud 58 near the center thereof. A supporting arm 88 connected to the nozzle 86 is carried by an upright gear rack 90 received by the gear box 92 having an adjusting knob 94 by means of which the rack 90 may may be raised or lowered. Another gear rack 96 is secured at its righthand end to the gear box 92 and is received by another gear box 98 suitably secured to the hollow shaft 14. The gear box 98 is provided with an adjusting knob 100 to move the gear rack 96 horizontally. Thus, the nozzle 86 may be adjusted vertically and horizontally to a desired position.

Referring to the plenum 26, an outwardly extending flange 102 on the bottom edge of the side wall 28 is secured by means of threaded fasteners to an annular plate 104 which carries a cylindrical closure 106 on the outer periphery thereof. The supporting bar 20 is secured at its outer end to the closure 106 as shown. A plastic disk 108 is secured to the upper surface of the gear 16 by means of threaded fasteners or the like in spaced relation from the annular plate 104. A sealing gasket 110 of annular form is fitted into this space and is secured to the plastic plate 108 coaxially of the rod 10. Preferably the gasket 110 is glued to the plate 108. The plenum and more particularly the annular plate 104 slidably or moveably engages the gasket 110 such that the plenum 26 can rotate relative to the gear 16. A rotatable connection is thus provided between the plenum 26 and the remainder of the apparatus which connection is sealed against air leakage.

In operation, the welding or cutting machine is caused to rotate about the supporting rod 10 by operating the driving motor 18. This rotation results from engagement of the driving gear 22 with the larger gear 16 which in turn imparts rotation to the supporting arm 20 and the hollow shaft 14. Since the supporting structure for the nozzle 86 is carried by the hollow shaft 14, the nozzle 86 is rotated also. The supporting arm 20 also imparts rotation to the plenum 26 such that the plenum and shroud rotate in unison. The plenum cover plate 32 remains stationary since it is held in place by the supporting rod 10.

Suction applied to the exhaust tubes 44 produces a flow of air from beneath the shroud 58 upwardly through the fittings 82, 84, the tubing sections 54 and 56 and into the plenum 26 from which such flow is exhausted out of the tubes 44. These currents of air within the shroud 58 flow generally in the directions of the arrows, these directions including both vertical and horizontal components. Smoke and fumes generated by the nozzle 86 are hot and tend to rise. Since the air flow includes vertical components, the rising fume and smoke combines with the vertical flow to be exhausted through the fittings 82 and 84. Also by reason of the cutout 64 in the side of the shroud, induced flow will have a horizontal component thereby assuring capture of the generated smoke and fumes for exhausting through the shroud fittings.

By locating the fittings 82 and 84, one diametrically remote from the opening 64 and the other adjacent thereto assures pickup of the fumes and smoke. In some instances, the force of the burning gases emitted by the nozzle 86, as viewed in FIG. 1, tends to blow the smoke toward the left, and into the path of the upwardly and horizontally directed currents that are flowing into the fitting 82. Any smoke tending to escape from the shroud opening 64, of course, is picked up by the fitting 84.

The skirt 62 serves a two fold purpose of providing a capture space within the shroud and also as a light shield against the burning glare produced by the nozzle 86.

Use of the present invention provides for greater efficiency in the pick up of fumes and smoke thereby maintaining a cleaner atmosphere in the working area around the welding and cutting machine. The rubber seal 110 prevents leakage into the plenum 26 thereby contributing to the overall operating efficiency. Preferably, the plenum parts, including the cover plate 32, the side wall 28 and fittings 46 and 48 are formed of a suitable plastic which is light in weight and provides effective seals where they are joined or abutted together.

While there have been described above the principles of this invention in connection with specific apparatus, it is to be clearly understood that this description is made only by way of example and not as a limitation to the scope of the invention.

What is claimed is:

1. Smoke exhaust apparatus for a rotary welder comprising an upright elongated stationary carrier, a support member mounted on said carrier for rotation about and upright axis, plenum and shroud elements vertically spaced apart and connected to said support member for rotation therewith, said plenum having intake and exhaust ports; said shroud including a horizontally disposed plate having a depending skirt around a portion of the periphery thereof to provide an opening in the side of the shroud, smoke inlet ports in said plate, tubing connecting said smoke inlet ports to said intake ports, whereby suction applied to said exhaust ports causes a flow of air through said side opening and from the interior of said shroud upwardly through said smoke inlet ports, through said tubing and intake ports and into said plenum from which said flow passes outwardly of said exhaust ports.

2. The apparatus of claim 1 wherein said carrier is a rod element and said support member is a hollow shaft coaxially mounted on said rod element, the plate of said shroud being secured to the lower end of said hollow shaft, said shroud being cylindrically shaped, each said smoke inlet port including a tubular fitting secured within an opening in said plate with the lower end of said fitting being adjacent to the underside of said plate to capture smoke contained within said shroud.

3. The apparatus of claim 2 wherein there are at least two smoke inlet ports in said shroud, one inlet port being disposed adjacent the side of said shroud opposite and remote from said opening, the other inlet port being disposed adjacent to said opening.

4. The apparatus of claim 3 including a metal-melting device disposed beneath said shroud and carried for rotation therewith, whereby smoke generated by said device is collected by said shroud and exhausted through said smoke inlet ports, currents of air being formed which move vertically past said device and horizontally through said opening and into said shroud.

5. The apparatus of claim 1 including a metal-melting device disposed beneath said shroud and carried for rotation therewith, whereby smoke generated by said device is collected by said shroud and exhausted through said smoke inlet ports, currents of air being formed which move vertically past said device and horizontally through said opening and into said shroud.

* * * * *